(12) United States Patent
Daellenbach et al.

(10) Patent No.: US 8,566,774 B2
(45) Date of Patent: Oct. 22, 2013

(54) OPTIMIZED BUFFER PLACEMENT BASED ON TIMING AND CAPACITANCE ASSERTIONS

(75) Inventors: Lukas Daellenbach, Boeblingen (DE); Elmar Gaugler, Boeblingen (DE); Ralf Richter, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/293,351

(22) Filed: Nov. 10, 2011

(65) Prior Publication Data

US 2012/0151193 A1    Jun. 14, 2012

(30) Foreign Application Priority Data

Dec. 13, 2010  (EP) .................................... 10194755

(51) Int. Cl.
  *G06F 9/455*   (2006.01)
  *G06F 17/50*   (2006.01)
(52) U.S. Cl.
  USPC ............ 716/134; 716/126; 716/129; 716/132
(58) Field of Classification Search
  USPC ........................................................ 716/114
  See application file for complete search history.

(56) References Cited

U.S. PATENT DOCUMENTS

| | | | |
|---|---|---|---|
| 7,577,933 B1 | 8/2009 | Wu et al. | |
| 2005/0034091 A1 | 2/2005 | Harn | |
| 2005/0138578 A1* | 6/2005 | Alpert et al. | 716/2 |
| 2009/0119630 A1 | 5/2009 | Binder et al. | |
| 2009/0254874 A1 | 10/2009 | Bose | |
| 2010/0128760 A1* | 5/2010 | Ballard et al. | 375/214 |

* cited by examiner

*Primary Examiner* — Paul Dinh
*Assistant Examiner* — Bryce Aisaka
(74) *Attorney, Agent, or Firm* — Dennis Jung, Esq.; Kevin P. Radigan, Esq.; Heslin Rothenberg Farley & Mesiti P.C.

(57) ABSTRACT

A method is provided for optimized buffer placement based on timing and capacitance assertions in a functional chip unit including a single source and multiple macros, each having a sink. Placement of the source and macros with the sinks is pre-designed and buffers are placed in branches connecting the source with the multiple sinks. The method includes: calculating an estimated slack for each branch based on cycle reach, calculating a minimum slack for each branch, arranging branches according to the calculated slack to evaluate at least one most critical branch, inserting decoupling buffers in all branches except the most critical branch(es) and placing decoupling buffers close to the source, globally routing the most critical branch(es) and fixing slew conditions within this branch, globally routing at least one subsequent branch as arranged according to the calculated slack and fixing slew conditions within this branch(es), and routing all remaining branches.

10 Claims, 12 Drawing Sheets

US 8,566,774 B2

OPTIMIZED BUFFER PLACEMENT BASED ON TIMING AND CAPACITANCE ASSERTIONS

PRIOR FOREIGN APPLICATION

This application claims priority from European patent application number 10194755.4, filed Dec. 13, 2010, which is hereby incorporated herein by reference in its entirety.

BACKGROUND

The present invention relates to a method for optimized buffer placement based on timing and capacitance assertions in a functional chip unit comprising a signal source and multiple macros, each having a sink, whereby the placement of the source and the macros with the sinks is pre-designed and the buffers are placed in branches connecting the source with the multiple sinks. The invention further relates to a computer-readable medium containing a set of instructions that causes a computer to perform the above method and a computer program product comprising a computer-usable medium including a computer-usable program code, wherein the computer-usable program code is adapted to execute the above method. The invention also relates to a system for optimized buffer placement based on timing and capacitance assertions in a functional chip unit comprising a single source and multiple macros each having a sink, the system comprising a processing unit with a storage device for storing a computer-usable program code and a processor for executing the computer-usable program code for optimizing buffer placement according to the above method.

The placement of buffers in signal paths is an important issue when designing a functional chip unit. The term functional chip unit refers to any functional entity on a chip, or to the entire chip itself. Important is, that the chip unit comprises individual macros, which have to be connected to the source. The signal paths have to be designed, so that signals are transmitted between the source and the different sinks under consideration of required arrival time (RAT), and having a sufficient slew, so that the signal can be correctly identified upon reception. Buffers, which are inserted in the signal paths, usually consist of a group of two inverters and refresh the signal along the signal path. The drawback of the buffers is a negative impact on the arrival time of the signal.

It is therefore important to properly design the branches between the source and the sinks. In the state of the art, this is done by timing runs based on assertions of macros or instances and I/O-nets, where the term instances refers to any kind of functional groups within the functional chip unit. The provided placement of the source and the macros with the sinks as predesigned is loaded into a router, which provides routing for all branches within the given chip unit. All instances are utilized with data from the timing run and a buffer optimization tool adds buffers within the branches. Then, a next timing run based on the routing with the added buffers is performed, which usually identifies timing problems in at least some of the branches. Problems considered here are a signal slack, which refers to the time the signal requires for being transmitted between the source and the sink, and slew problems. These problems are based on non-optimal buffer placement. Accordingly, branches with timing problems have to be re-designed manually, comprising re-routing the branch and replacing the buffers. Then a new timing run has to be performed and the subsequent steps as described above have to be executed in an iterative way, until the functional chip unit fulfils all slack and slew requirements. This method is very time-consuming and not deterministic, so that an improvement is desired.

BRIEF SUMMARY

Provided herein, in one aspect, is a method for optimizing buffer placement based on timing and capacitance assertions in a functional chip unit comprising a single source and multiple macros, each having a sink. The placement of the source and the macros with the sinks is predesigned, and the buffers are placed in branches connecting the source with the multiple sinks. The method includes: calculating an estimated slack for each branch based on cycle reach; arranging the branches according to the calculated slack to evaluate at least one most critical branch; inserting the decoupling buffers in all branches except the at least one most critical branch and placing decoupling buffers close to the source; globally routing the at least one most critical branch and fixing slew conditions within this branch; globally routing at least one subsequent branch as arranged according to the calculated slack and fixing slew conditions within this at least one branch; and routing all remaining branches.

In another aspect, a computer program product is provided for optimized buffer placement based on timing and capacitance assertions in a functional chip unit comprising a single source and multiple macros, each having a sink. The placement of the source and the macros with the sinks is predesigned and the buffers are placed in branches connecting the source with the multiple sinks. The computer program product includes a computer-readable storage medium readable by a processor and storing executable instructions for execution by the processor for performing a method. The method includes: calculating an estimated slack for each branch based on cycle reach; arranging the branches according to the calculated slack to evaluate at least one most critical branch; inserting decoupling buffers in all branches except the at least one most critical branch and placing decoupling branches close to the source; globally routing the at least one most critical branch and fixing slew conditions within this branch; globally routing at least one subsequent branch as arranged according to the calculated slack and fixing slew conditions within this at least one branch; and routing all remaining branches.

BRIEF DESCRIPTION OF THE SEVERAL VIEWS OF THE DRAWINGS

Various embodiments of the invention are illustrated in the accompanied figures. These embodiments are merely exemplary, i.e. they are not intended to limit the content and scope of the appended claims.

DETAILED DESCRIPTION

Figure 1:
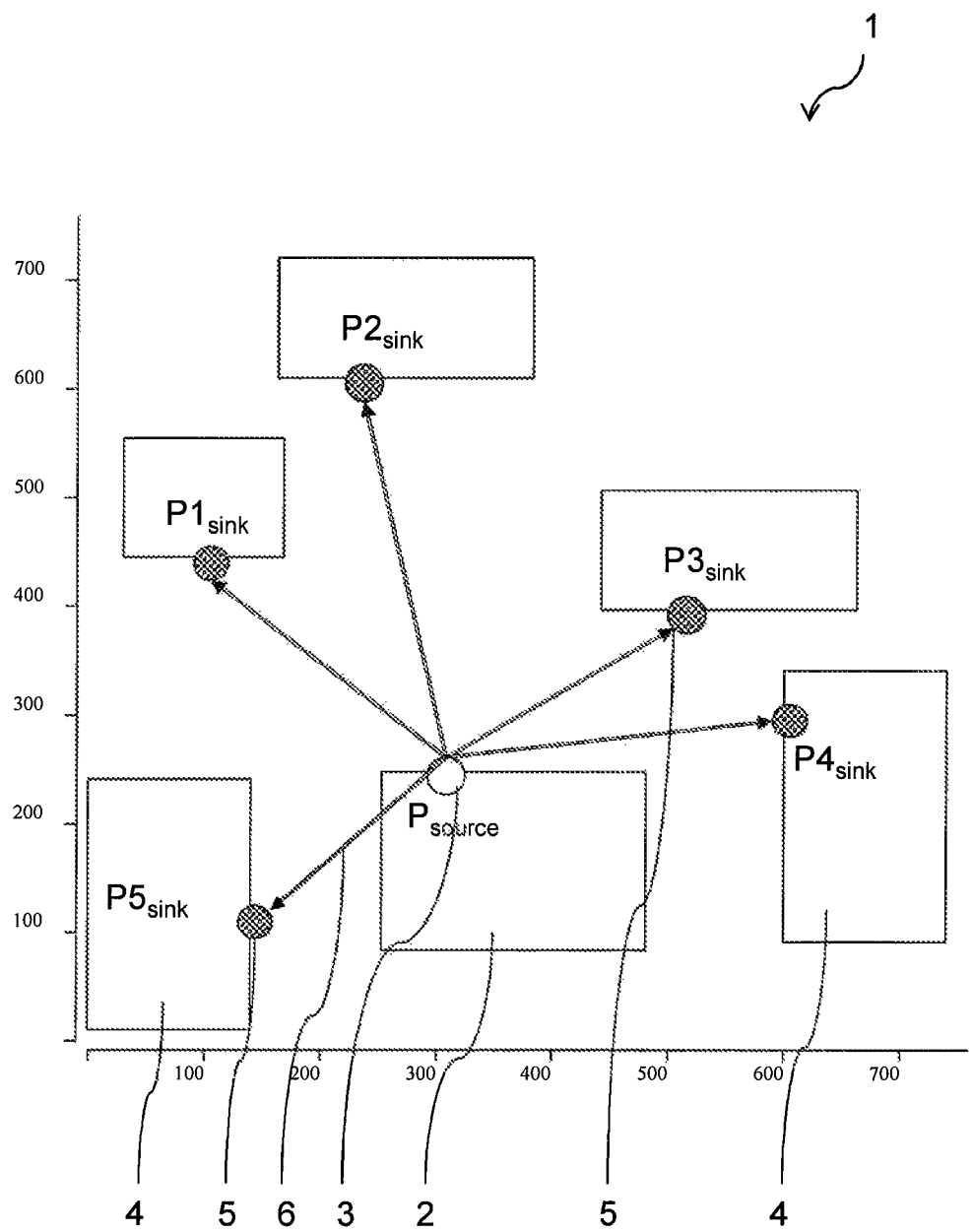
FIG. 1 shows a functional chip unit comprising a source and five macros, each having a sink, as a schematic diagram, in accordance with one or more aspects of the present invention.

It is an object of the present invention to provide a method and a system for optimized buffer placement, which considers timing and capacitance assertions, which allows easily and automatically performing the buffer placement, and additionally provides reproducible deterministic results.

This object is achieved by the independent claims. Advantageous embodiments are detailed in the dependent claims.

Accordingly, this object is achieved by a method for optimized buffer placement based on timing and capacitance assertions in a functional chip unit comprising a single source and multiple macros, each having a sink, whereby the placement of the source and the macros with the sinks is pre-designed and the buffers are placed in branches connecting the source with the multiple sinks, comprising the steps of calculating an estimated slack for each branch based on cycle reach, arranging the branches according to the calculated slack to evaluate at least one most critical branch, inserting decoupling buffers in all branches except the at least one most critical branch and placing decoupling buffers close to the source, globally routing the at least one most critical branch and fixing slew conditions within this branch, globally routing at least one subsequent branch as arranged according to the calculated slack and fixing slew conditions within this at least one branch, and routing all remaining branches.

This object is further achieved by a computer-readable media containing a set of instructions that causes a computer to perform the above method and a computer program product comprising a computer-usable medium including a computer-usable program code, wherein the computer-usable program code is adapted to execute the above method.

The object is further achieved by a system for optimized buffer placement based on timing and capacitance assertions in a functional chip unit comprising a single source and multiple macros each having a sink, the system comprising a processing unit with a storage device for storing computer usable program code and a processor for executing the computer usable program code for optimizing buffer placement according to the above method.

The basic idea of the present invention is to arrange the branches according to the calculated slack by using cycle reach estimation, so that branches having most critical slack can be identified and considered first for routing and buffer placement. Since all other branches are decoupled, they almost have no influence on the most critical branch. When the Steiner/Manhattan optimal global routing of the most critical branch is finished, the slew conditions within this branch can be fixed, so that the branch fulfils slack and slew requirements. Subsequent Steiner/Manhattan optimal global routing of at least one branch which shows a slack close to the at least one branch having the most critical slack allows to provide a hierarchical design of the branches to fulfill slack and slew requirements for these branches. Finally, all remaining branches, which show the uncritical slack conditions, are routed.

The method refers to a functional chip unit, which is supposed to be a part of an entire chip. Nevertheless, also the chip itself can be considered as functional unit, so that the method can be applied to the chip itself. Furthermore, the method is described for one single signal. Nevertheless, also multiple signals can be routed by using this method. The different signals can be routed in parallel or individually. The latter required in case source and/or sinks are not located together.

According to a modified embodiment of the present invention the step of arranging the branches according to the calculated slack by using cycle reach estimation to evaluate at least one most critical branch comprises arranging the branches in groups of critical, intermediate, and uncritical branches, whereby the group of critical branches referring to the at least one most critical branch, the group of intermediate branches referring to the at least one subsequent branch as arranged according to the calculated slack and the group of uncritical branches referring to the remaining branches. By identifying groups of branches, these groups of branches can be a processed simultaneously or one after each other, as long as these branches of each group are processed together. The grouping of the branches depends on the individual requirements based on the chip unit. Nevertheless, two possible classifications are given by way of example. In a first classification, critical branches are identified by having a negative slack, intermediate branches have a positive slack but use 95% to 100% of a cycle time of the chip unit, and uncritical branches use less than 95% of the cycle time. According to the second example, critical branches have a delay bigger than 120% of the cycle time, intermediate branches have a delay between 100% and 120% of the cycle time and uncritical branches have a delay below 100% of the cycle time. In further modified embodiments the branches can be grouped in an increased number of groups.

In one embodiment of the present invention the step of calculating a minimum slack for each branch comprises evaluating a cycle reach table, assertions of the source signal and/or floor plan data of the chip unit. This information is suitable for calculating the slack between the source and the respective sink. The floor plan data is available from the design of the chip unit, the assertions of the source signal can for example be based on information from outside the chip unit. The cycle reach table contains information regarding the distance a signal can travel, until the cycle limit is reached.

According to another embodiment of the present invention at least one of the macros comprises multiple sub-macros and incrementally applying the method to the macro as a chip unit. Accordingly, a hierarchical design of the chip unit can be performed.

In a modified embodiment of the present invention the step of routing at least one subsequent branch as arranged according to the calculated slack and fixing slew conditions within this at least one branch comprises incrementally applying this step to the at least one further subsequent branch as arranged according to the calculated slack. In this embodiment the branches are processed according to their calculated slack, which adds a priority to the branches for routing. By fixing first most critical branches, it is assumed that these branches can be more easily processed, since other branches are decoupled and have not to be considered. Less critical branches can be processed even though other branches are already routed within the chip unit.

According to another embodiment of the present invention fixing slew conditions within a branch comprises inserting at least one buffer in this branch. The buffer, which usually comprises a couple of inverters, refreshes the signal within the branch, so that it is received at the respective sink having a sufficient slope.

A further embodiment of the present invention comprises the step of comparing a current slack condition of the at least one subsequent branch as arranged according to the calculated slack and the at least one most critical branch and re-routing the at least one subsequent branch as arranged according to the calculated slack in case its current slack condition is more critical than the current slack condition of the at least one most critical branch. Accordingly, if the slack of a branch, which was not most critical, is worse after routing, especially worse than the slack of the most critical branch, re-design of the branch can be required. In an alternate embodiment, the re-design can be required, if the slack of the branch exceeds critical slack value.

In another embodiment of the present invention the step of re-routing the at least one subsequent branch as arranged according to the calculated slack comprises the steps of identifying an intercept point on the at least one most critical branch, where the Steiner/Manhattan minimum and the routing of the at least one most critical branch meet, deleting the path of the at least one most critical branch between the source and the intercept point as well as the at least one subsequent branch as arranged according to the calculated slack and re-routing the at least one subsequent branch as arranged according to the calculated slack via the intercept point. This allows a common use of a part of a branch, which permits to reduce the total number of used buffers. Since buffers usually have a capacitance, the overall capacitance can be reduced, which reduces slack problems.

In a preferred embodiment of the present invention routing all remaining branches comprises merging buffers of all remaining branches. By merging especially the decoupling buffers close to the source, the capacitance at the source can be reduced.

According to a modified embodiment of the present invention routing all remaining branches comprises fixing slew conditions within the remaining branches. As required, additional buffers can be added also within the remaining branches, so that the signal is transmitted with a sufficient slew.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a chip unit 1 can be seen. The chip unit 1 comprises a source 2 having a connector 3 and a set of five macros 4, having each a sink 5. The source 2 and the macros 4 are arranged together on a topology, as indicated by the coordinate axis. The source 2 and the sinks 4 are to be connected by branches 6 indicated by arrows.

Figure 12:
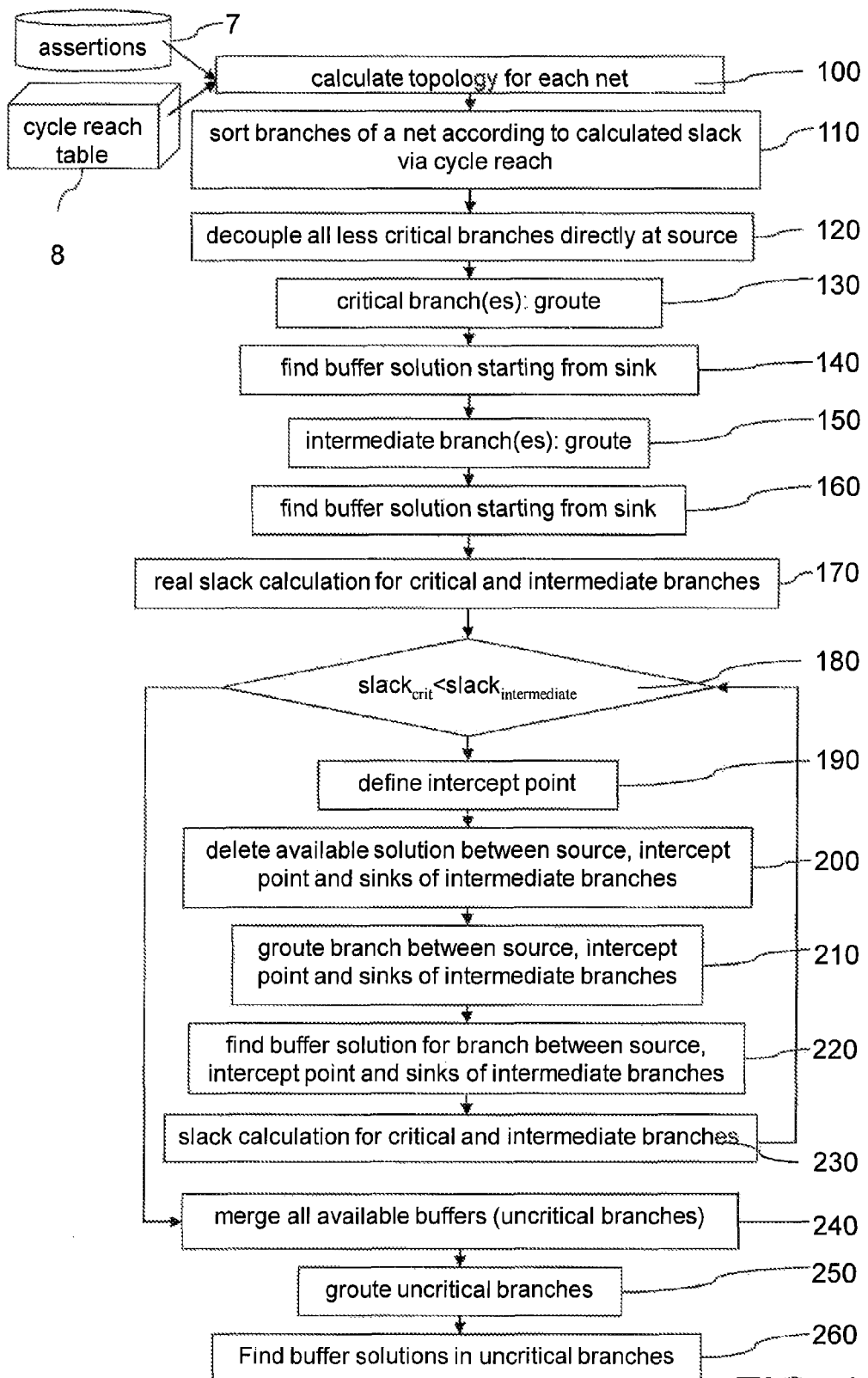
FIG. 12 shows a flow chart of one embodiment of processing, in accordance with one or more aspects of the present invention.

According to the flow diagram shown in FIG. 12, a starting point in step 100 for the inventive method according to this embodiment is FIG. 1. The entire set of branches 6 for one signal indicated by the arrows form a net, which is to be calculated. The calculation of the topology of the net is based on the floor plan shown in FIG. 1, assertions 7 of the source signal and a cycle reach table 8 which contains a maximum distance to reach on a cycle. The calculation applies the Steiner/Manhattan distance to each path for evaluating an estimated slack value, which is calculated as the difference between a required arrival time at the sink 4 and a required arrival time at the connector 3 and the wire delay of the branch 6 calculated with the cycle reach table 8. Accordingly, the slack is an indication for the time the signal needs from the connector 3 to the sink 5. The branches 6 at this stage are merely indicating the necessary connection from the connector 3 to the sinks 5

In step 110, all branches 6 of the net are sorted according to their estimated slack. This includes forming groups of branches 6, where a first group contains critical branches 6a having a critical slack, a second group contains the intermediate branches 6b having an intermediate slack, which is close to the critical slack, and a third group of remaining branches 6c having an uncritical slack. The branches 6 are grouped depending on the chip unit 1. The groups in this embodiment are by way of example defined by a critical delay being more than 120% of a cycle, an intermediate delay being between 100% and 120% of a cycle and an uncritical delay being less than 100% of a cycle. The classification of the branches 6 can be seen in FIG. 2, where the branches 6 are separated into critical branches 6a, an intermediate branch 6b, and uncritical branches 6c.

Figure 2:
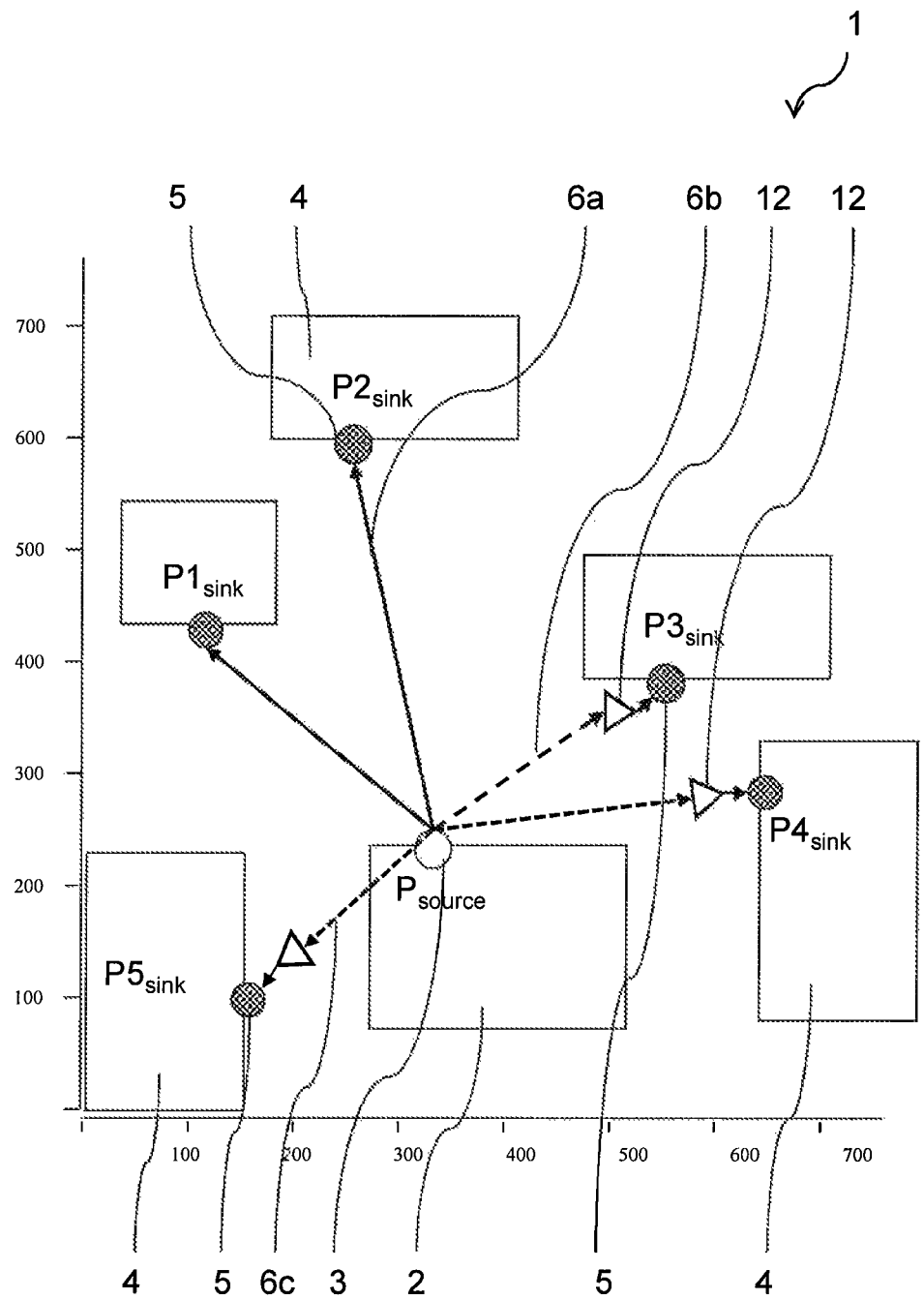
FIG. 2 shows the chip unit according to FIG. 1 with connections between the source and the sinks classified in critical, intermediate and uncritical, in accordance with one or more aspects of the present invention.
Figure 3:
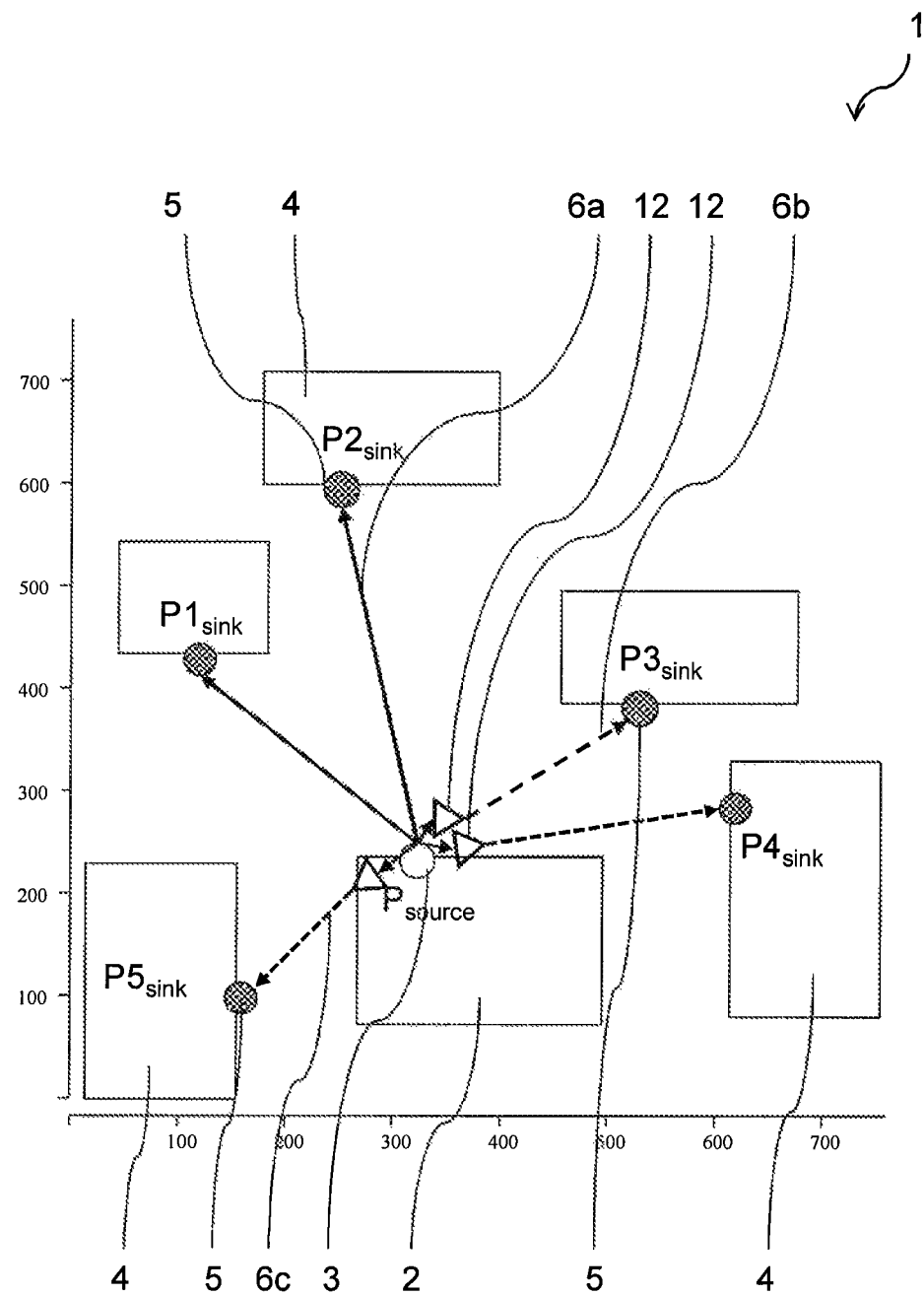
FIG. 3 shows the chip unit according to FIG. 2 with additional decoupling buffers inserted close to the source, in accordance with one or more aspects of the present invention.

According to step 120, buffers 12 are inserted into all intermediate branches 6b and uncritical branches 6c via cycle reach. The buffers 12 are placed close to the sinks 5, as shown in FIG. 2. As shown in FIG. 3, the buffers 12 are then shifted towards the connector 3 of the source 2, so that the critical branches 6a are reliably decoupled from the remaining branches 6b, 6c. Accordingly, the impact of the intermediate branch 6b and the uncritical branches 6c on the critical branches 6a is minimized.

Figure 4:
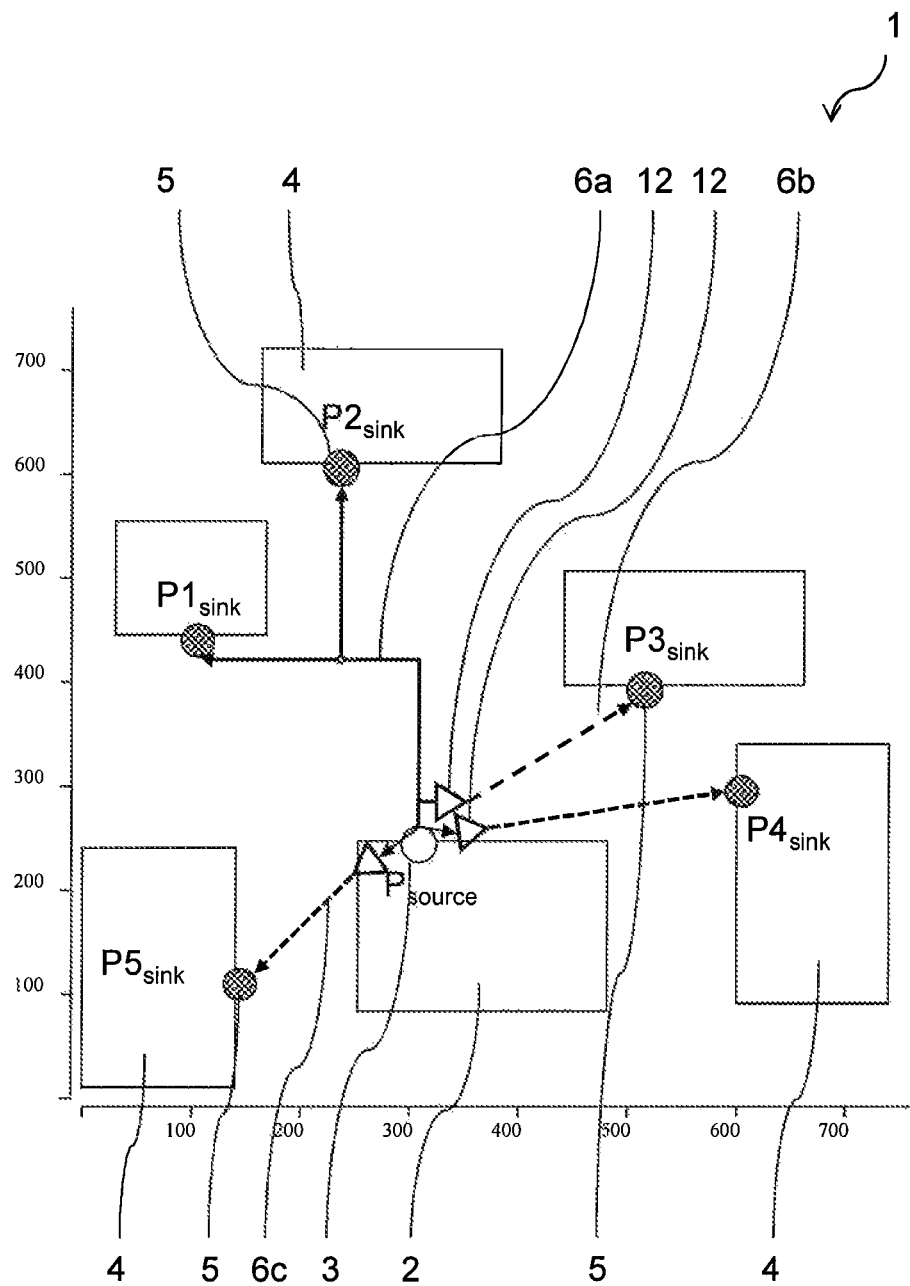
FIG. 4 shows the chip unit according to FIG. 3 with the designed critical branches after Steiner/Manhattan optimized global routing, in accordance with one or more aspects of the present invention.

In step 130, the most critical branches 6a are routed. In this embodiment of the present invention, a groute algorithm is used. This algorithm performs a global routing under application of the Steiner/Manhattan optimum for applying an optimum routing. The routed critical branches 6a can be seen in FIG. 4.

Figure 5:
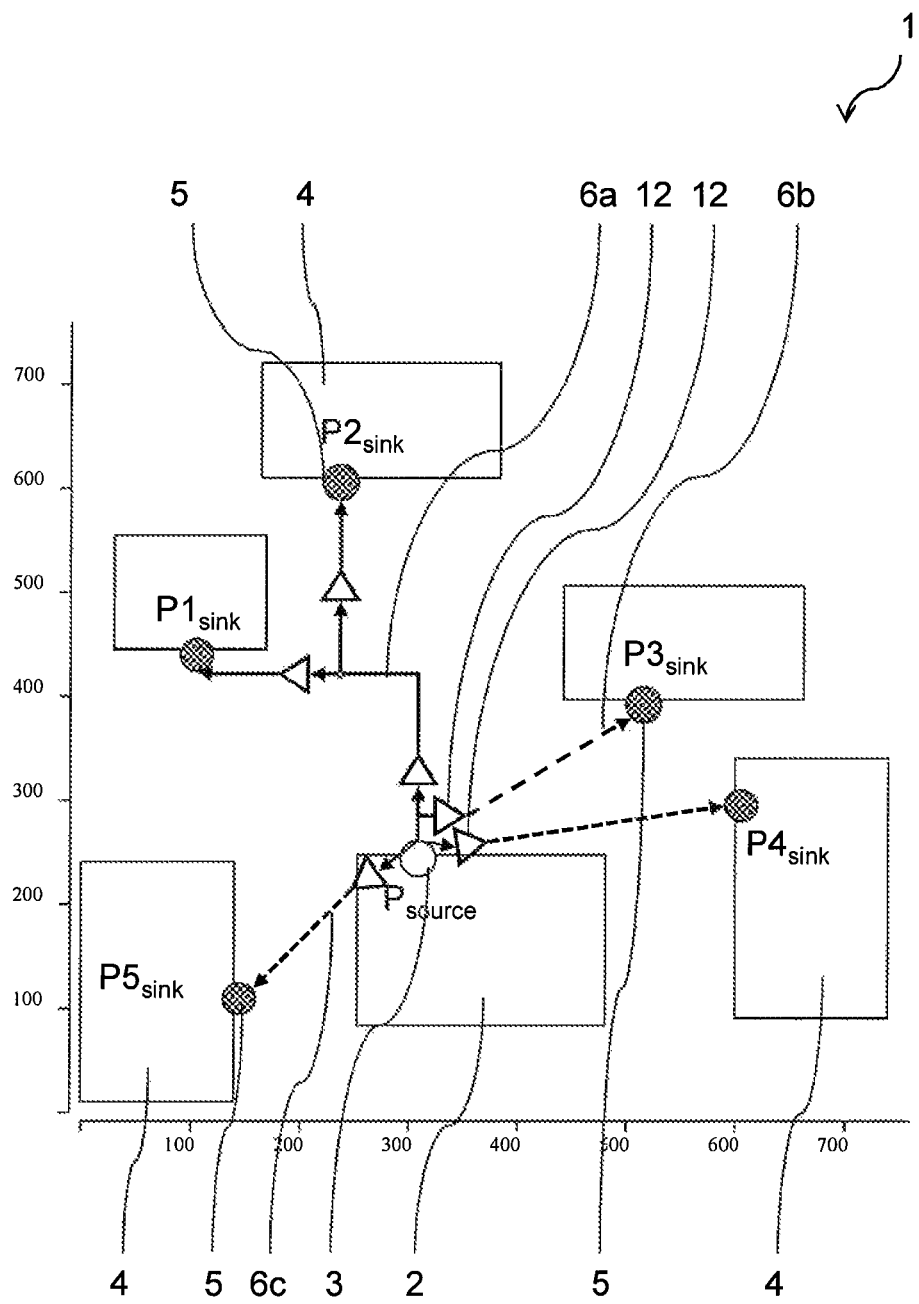
FIG. 5 shows the chip unit according to FIG. 4 with additional buffers in the critical branches, in accordance with one or more aspects of the present invention.

According to step 140, the slew of the critical branches 6a is evaluated. If the slew is too bad, additional buffers 12 are inserted into the critical branches 6a. After adding the buffers 12, slack and slew in the critical branches 6a are re-calculated not based on cycle reach anymore, but based on real placement of the buffers 12. This can be seen in FIG. 5.

Figure 6:
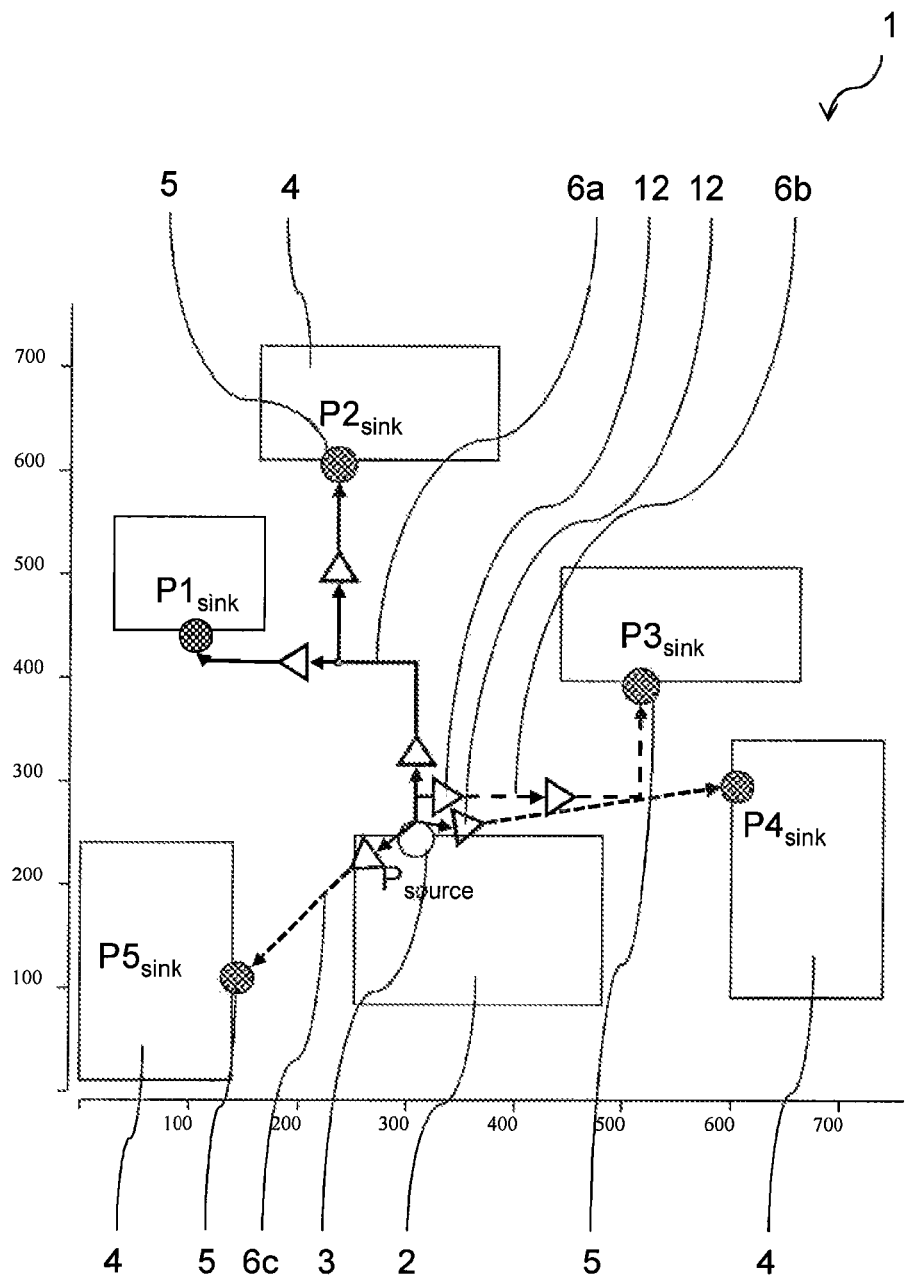
FIG. 6 shows the chip unit according to FIG. 5, where a routing for the intermediate branch has been added including additional buffers, in accordance with one or more aspects of the present invention.

According to step 150, the intermediate branches 6b are routed using groute as described above. The routed intermediate branch 6b can be seen in FIG. 6.

In step 160, a buffer 12 solution for the intermediate branches 6b is found to fix the slew of the signal. The additional buffer 12 can also be seen in FIG. 6.

In step 170, the real slack for the critical branches 6a and intermediate branches 6b is calculated. The real slack is calculated under consideration of the design of the branches 6a, 6b, e.g. the used metal layer and the width of the branch, and the real placement of the buffers 12.

According to step 180, it is verified if the slack of the critical branches 6a $slack_{crit}$ is smaller than the slack of the intermediate branches $slack_{intermediate}$. In case this condition is true, the method continuous with step 240. Otherwise it continues with step 190.

Figure 7:
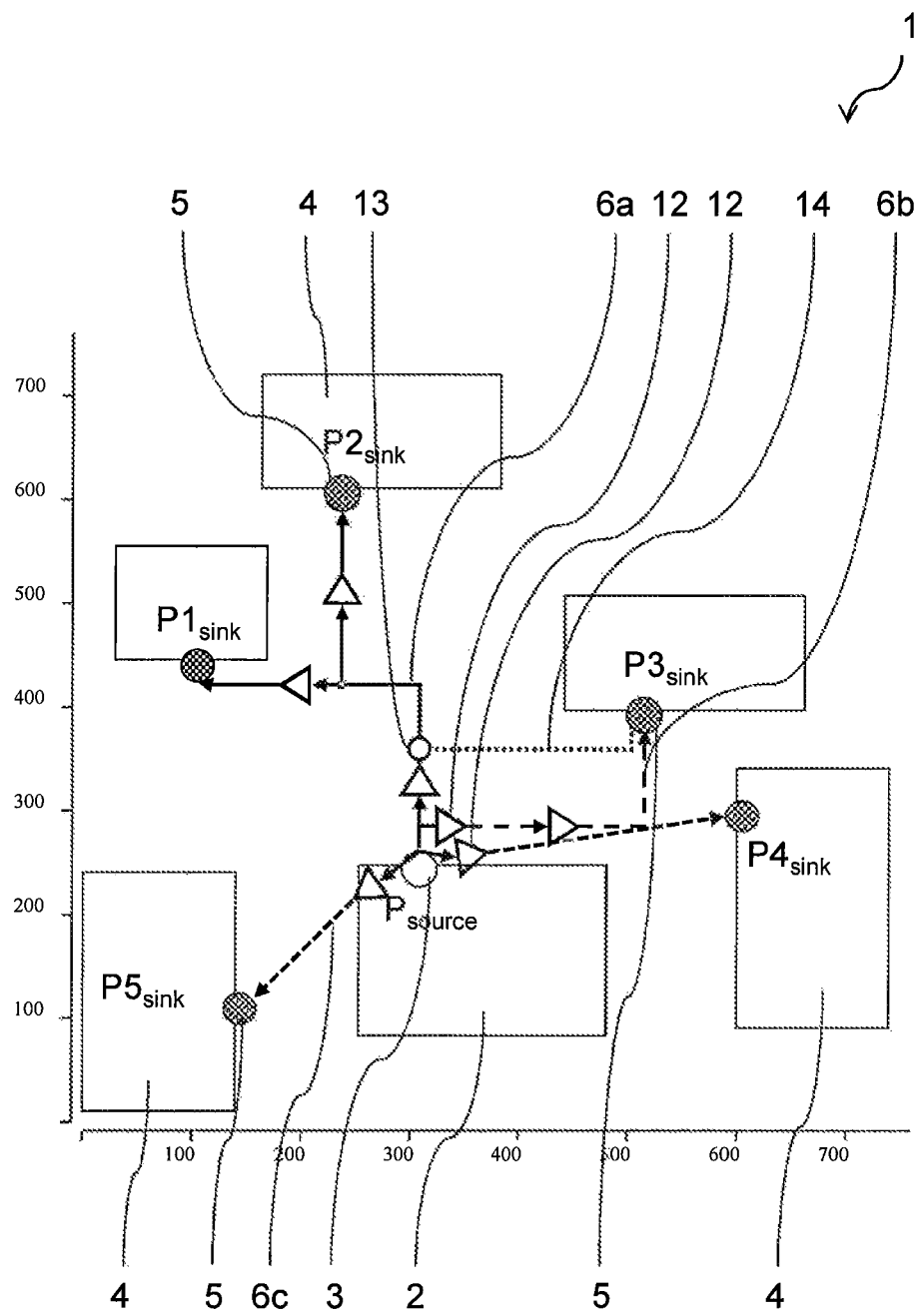
FIG. 7 shows the chip unit according to FIG. 6 with an Steiner/Manhattan optimized intercept point for re-design of the intermediate branch, in accordance with one or more aspects of the present invention.

In step 190, an intercept point 13 is determined by evaluating the shortest Steiner/Manhattan distance between the sink 5 of the intermediate branch 6b and the routed critical branch 6a. The intercept point 13 is defined where the groute of the critical branch 6a and the Steiner/Manhattan estimation meet. This can be seen in FIG. 7, where the Steiner/Manhattan estimation is indicated by a dashed line 14.

Figure 8:
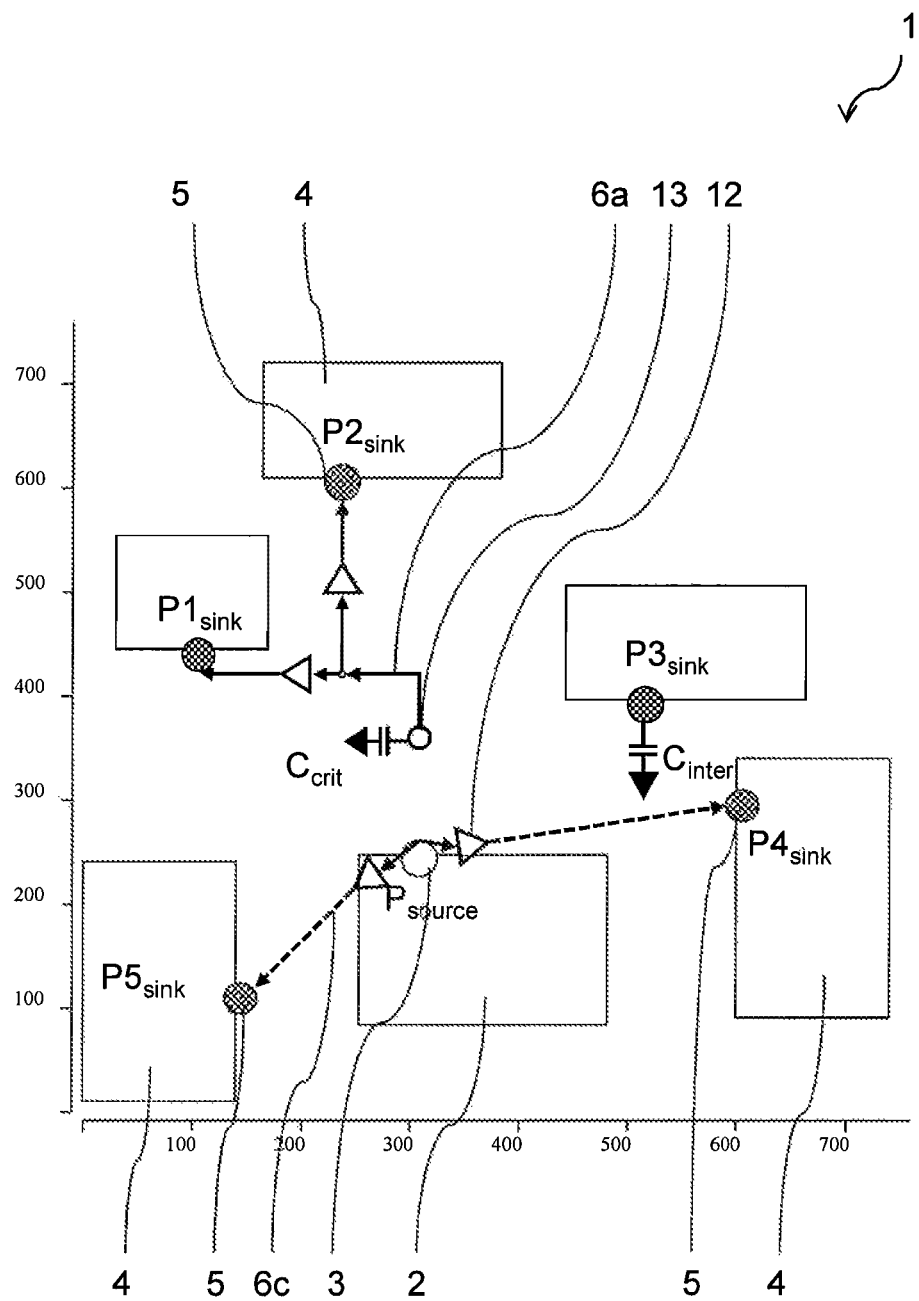
FIG. 8 shows the chip unit according to FIG. 7, where the intermediate branch and the branch between the source and the intercept point are removed, in accordance with one or more aspects of the present invention.

According to step 200, the intermediate branch 6b and the critical branch 6a between the connector 3 and the intercept point 13 are deleted, as shown in FIG. 8. As input for the following steps, the capacitance $C_{crit}$ at the intercept point 13 and the capacitance $C_{inter}$ at the sink 5 of the macro 4 are evaluated.

Figure 9:
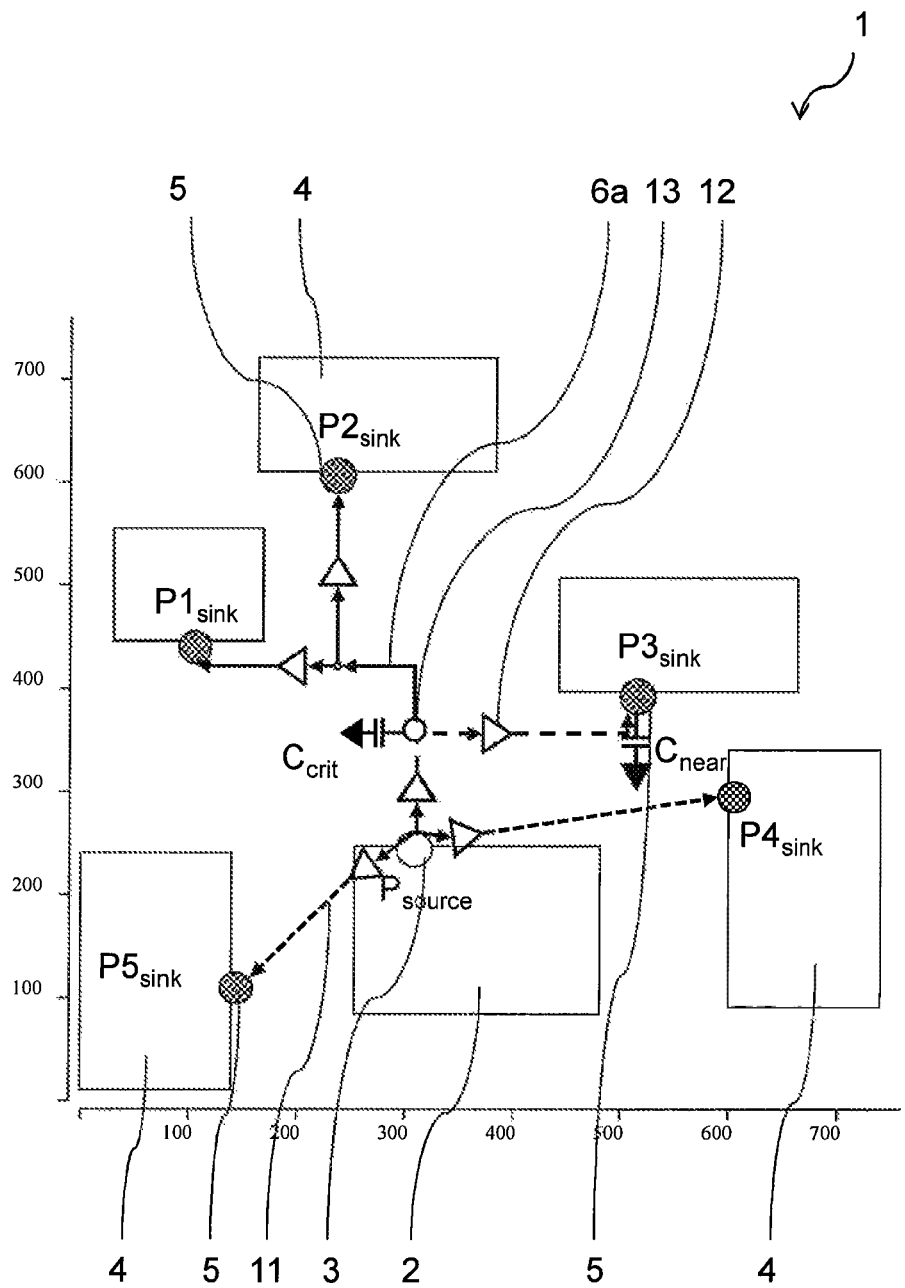
FIG. 9 shows the chip unit according to FIG. 8 with the intermediate branch re-routed and re-buffered via the intercept point, in accordance with one or more aspects of the present invention.

In step 210 an improved routing of the intermediate branch 6b is calculated from the sink 5 of the macro 4 via the intercept point 13 to the connector 3 of the source 2 to determine a new global routing. The new routing can be seen in FIG. 9.

According to step 220, buffers 12 are placed in the newly designed intermediate branch 6, which is the intermediate branch 6b from the connector 3 to the sink 5 via the intercept point 13, to fix the slew.

In step 230, the slack is re-calculated based on the new placement of the buffers 12 on the critical branch 6a and the intermediate branch 6b. The method then returns to step 180.

Figure 10:
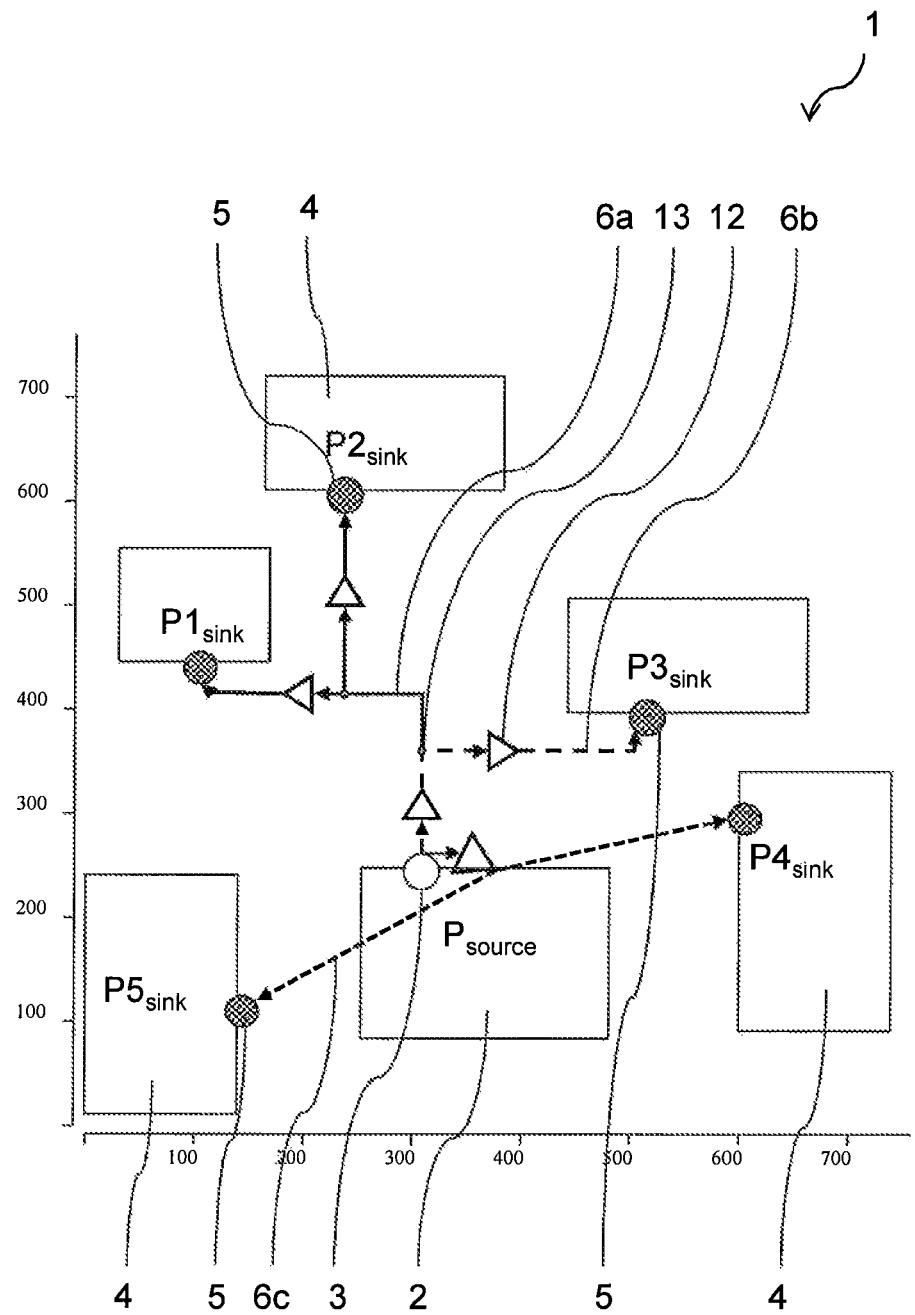
FIG. 10 shows the chip unit according to FIG. 9, where the decoupling buffers of the remaining branches have been merged, in accordance with one or more aspects of the present invention.

According to step 240, the buffers 12 for decoupling the uncritical branches 6c are merged together, as shown in FIG. 10. This helps to reduce a load capacitance at the connector 3.

Figure 11:
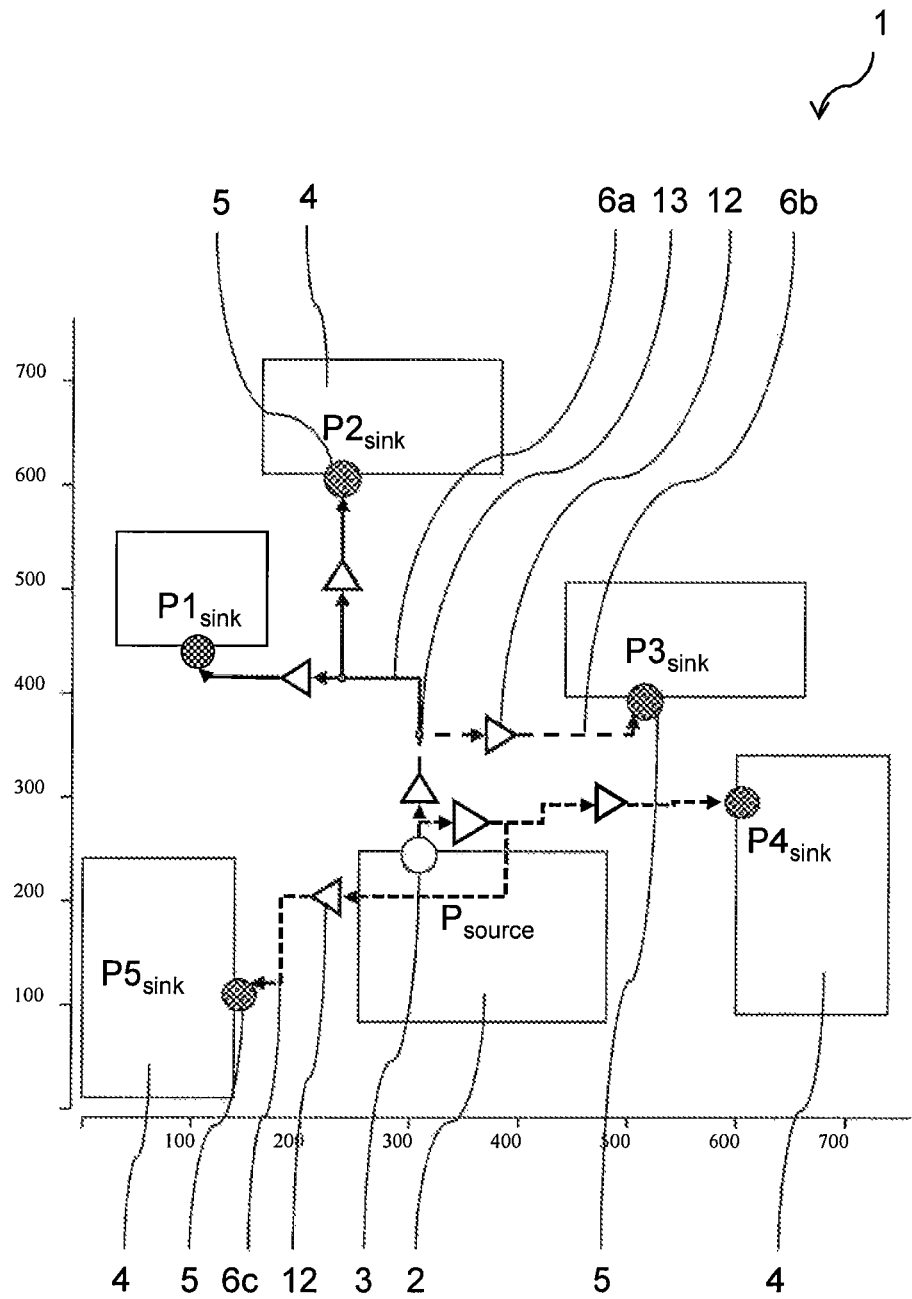
FIG. 11 shows the chip unit according to FIG. 10, where the remaining branches have been routed and additional buffers being inserted, in accordance with one or more aspects of the present invention.

In step 250, routing is performed for all uncritical branches 6c. The used method is again groute. The uncritical branches 6c after routing can be seen in FIG. 11.

In step 260, the slew of the uncritical branches 6c is fixed. Accordingly, buffers 12 are inserted into the uncritical branches 6c. This can also be seen in FIG. 11.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A method for optimized buffer placement based on timing and capacitance assertions in a functional chip unit comprising a single source and multiple macros, each having a sink, wherein the placement of the source and the macros with the sinks is pre-designed and the buffers are placed in branches connecting the source with the multiple sinks, the method comprising:

calculating, by a processor, an estimated slack for each branch of the branches, arranging the branches according to the calculated slack to evaluate at least one most critical branch of the branches, inserting decoupling buffers in each branch of the branches except for the at least one most critical branch, wherein the inserted decoupling buffers are placed close to the source, globally routing the at least one most critical branch and fixing slew conditions within this branch, subsequently, globally routing at least one next branch of the branches as arranged according to the calculated slack and fixing slew conditions within this at least one next branch, wherein globally routing the at least one next branch comprises:

performing an initial routing of the at least one next branch between the source and a sink of the at least one next branch, comparing a slack of the initial routing of the at least one next branch and a slack of the global routing of the at least one most critical branch to determine whether the slack of the initial routing of the at least one next branch is more critical than the slack of the global routing of the at least one most critical branch;

based on determining that the slack of the initial routing of the at least one next branch is more critical than the slack of the global routing of the at least one most critical branch, performing re-routing of the at least one next branch between the source and the sink of the at least one next branch, wherein a portion of a replacement routing of the at least one next branch replaces a portion of the global routing of the at least one most critical branch, and wherein re-routing the at least one next branch comprises:

identifying a point on the global routing of the at least one most critical branch for which minimum distance estimation, based on a Steiner tree construction, from the sink of the at least one next branch meets the global routing of the at least one most critical branch, removing a portion of the global routing of the at least one most critical branch between the source and the identified point, removing the initial routing of the at least one next branch, and based on a capacitance at the identified point and a capacitance at the sink of the at least one next branch, determining and routing the replacement routing extending between the source and the sink of the at least one next branch, via the identified point, and fixing slew conditions of the replacement routing, and routing at least one remaining branch of the branches.

2. The method of claim 1, wherein arranging the branches according to the calculated slack comprises arranging the branches in groups of critical, intermediate, and uncritical branches, the group of critical branches comprising the at least one most critical branch, the group of intermediate branches comprising the at least one subsequent branch as arranged according to the calculated slack and the group of uncritical branches comprising at least one remaining branch of the branches.

3. The method of claim 1, further comprising calculating a minimum slack for each branch by evaluating at least one of: a table indicating a maximum distance to reach on a cycle, assertions of a source signal, or floorplan data of the chip unit.

4. The method of claim 1, wherein at least one macro of the multiple macros comprises multiple sub-macros, and wherein the calculating, arranging, inserting, globally routing the at least one most critical branch, globally routing the at least one next branch, and routing at least one remaining branch are incrementally performed for the at least one macro as a chip unit.

5. The method of claim 1, wherein globally routing the at least one next branch incrementally routs and fixes slew conditions within the at least one next branch.

6. The method of claim 1, wherein the fixing slew conditions within a branch comprises inserting at least one buffer in the branch.

7. The method of claim 1, wherein routing the at least one remaining branch routes all remaining branches, wherein routing all remaining branches merges the decoupling buffers of inserted in the remaining branches as part of the inserting decoupling buffers in each branch of the branches except for the at least one most critical branch.

8. The method of claim 1, wherein routing the at least one remaining branch routes all remaining branches, wherein routing all remaining branches comprises fixing slew conditions within the remaining branches.

9. A computer program product for optimized buffer placement based on timing and capacitance assertions in a functional chip unit comprising a single source and multiple macros, each having a sink, wherein the placement of the source and the macros with the sinks is predesigned and the buffers are placed in branches connecting the source with the multiple sinks, the computer program product comprising:

a computer-readable storage medium readable by a processor and storing executable instructions for execution by the processor for performing a method, the method comprising:

calculating an estimated slack for each branch of the branches, arranging the branches according to the calculated slack to evaluate at least one most critical branch of the branches, inserting decoupling buffers in each branch of the branches except for the at least one most critical branch, wherein the inserted decoupling buffers are placed close to the source, globally routing the at least one most critical branch and fixing slew conditions within this branch, subsequently, globally routing at least one next branch of the branches as arranged according to the calculated slack and fixing slew conditions within this at least one next branch, wherein globally routing the at least one next branch comprises:

performing an initial routing of the at least one next branch between the source and a sink of the at least one next branch, comparing a slack of the initial routing of the at least one next branch and a slack of the global routing of the at least one most critical branch to determine whether the slack of the initial routing of the at least one next branch is more critical than the slack of the global routing of the at least one most critical branch, based on determining that the slack of the initial routing of the at least one next branch is more critical than the slack of the global routing of the at least one most critical branch, performing re-routing of the at least one next branch between the source and the sink of the at least one next branch, wherein a portion of a replacement routing of the at least one next branch replaces a portion of the global routing of the at least one most critical branch, and wherein re-routing the at least one next branch comprises:

identifying a point on the global routing of the at least one most critical branch for which a minimum distance estimation, based on a Steiner tree construction, from the sink of the at least one next branch meets the global routing of the at least one most critical branch, removing a portion of the global routing of the at least one most critical branch between the source and the identified point, removing the initial routing of the at least one next branch, and based on a capacitance at the identified point and a capacitance at the sink of the at least one next branch determining and routing the replacement routing extending between the source and the sink of the at least one next branch, via the identified point, and fixing slew conditions of the replacement routing, and routing at least one remaining branch of the branches.

10. A system for optimized buffer placement based on timing and capacitance assertions in a functional chip unit comprising a single source and multiple macros each having a sink, the system comprising a processing unit with a storage device for storing computer usable program code and a processor for executing the computer usable program code for optimizing buffer placement, the optimizing comprising:

calculating an estimated slack for each branch of the branches, arranging the branches according to the calculated slack to evaluate at least one most critical branch of the branches, inserting decoupling buffers in each branch of the branches except for the at least one most critical branch, wherein the inserted decoupling buffers are placed close to the source, globally routing the at least one most critical branch and fixing slew conditions within this branch, subsequently, globally routing at least one next branch of the branches as arranged according to the calculated slack and fixing slew conditions within this at least one next branch, wherein globally routing the at least one next branch comprises:

performing an initial routing of the at least one next branch between the source and a sink of the at least one next branch, comparing the slack of the initial routing of the at least one next branch and the slack of the global routing of the at least one most critical branch to determine whether the slack of the initial routing of the at least one next branch is more critical than the slack of the global routing of the at least one most critical branch, and based on determining that the slack of the initial routing of the at least one next branch is more critical than the slack of the global routing of the at least one most critical branch, performing re-routing of the at least one next branch between the source and the sink of the at least one next branch, wherein a portion of a replacement routing of the at least one next branch replaces a portion of the global routing of the at least one most critical branch, and wherein re-routing the at least one next branch comprises:

identifying a point on the global routing of the at least one most critical branch for which a minimum distance estimation, based on a Steiner tree construction, from the sink of the at least one next branch meets the global routing of the at least one most critical branch, removing a portion of the global routing of the at least one most critical branch between the source and the identified point, removing the initial routing of the at least one next branch, and based on a capacitance at the identified point and a capacitance at the sink of the at least one next branch determining and routing the replacement routing extending between the source and the sink of the at least one next branch, via the identified point, and fixing slew conditions of the replacement routing, and routing at least one remaining branch of the branches.

* * * * *